US009441934B2

(12) United States Patent
Berthiaume

(10) Patent No.: US 9,441,934 B2
(45) Date of Patent: Sep. 13, 2016

(54) PROTRACTOR

(71) Applicant: Raymond Berthiaume, Laval (CA)

(72) Inventor: Raymond Berthiaume, Laval (CA)

( * ) Notice: Subject to any disclaimer, the term of this patent is extended or adjusted under 35 U.S.C. 154(b) by 94 days.

(21) Appl. No.: 14/609,374

(22) Filed: Jan. 29, 2015

(65) Prior Publication Data

US 2015/0241193 A1 Aug. 27, 2015

Related U.S. Application Data

(60) Provisional application No. 61/942,867, filed on Feb. 21, 2014.

(51) Int. Cl.
*G01B 3/56* (2006.01)

(52) U.S. Cl.
CPC .................................... *G01B 3/563* (2013.01)

(58) Field of Classification Search
CPC ..................................................... G01B 3/563
USPC .................. 33/1 N, 418, 430, 452, 465, 471
See application file for complete search history.

(56) References Cited

U.S. PATENT DOCUMENTS

| 761,272 | A | | 5/1904 | Wagniere et al. |
|---|---|---|---|---|
| 840,628 | A | | 1/1907 | Johnson |
| 1,086,545 | A | | 2/1914 | Meister et al. |
| 1,351,527 | A | | 8/1920 | Lopez |
| 1,384,105 | A | | 7/1921 | Starrett et al. |
| 1,417,878 | A | * | 5/1922 | Abare ........................ B43L 7/12 33/495 |
| 3,339,285 | A | | 9/1967 | Baker et al. |
| 3,431,653 | A | * | 3/1969 | Mudon ..................... G01B 3/06 33/458 |
| 3,766,652 | A | * | 10/1973 | Gomez ..................... G06G 1/00 235/61 GM |
| 4,394,801 | A | * | 7/1983 | Thibodeaux ............. G01B 3/56 33/451 |
| 4,562,649 | A | | 1/1986 | Ciavarella |
| 4,693,011 | A | * | 9/1987 | Strayham ................ G01B 3/566 33/382 |
| 5,392,525 | A | | 2/1995 | Chow |
| 5,669,149 | A | * | 9/1997 | Meitzler ................... G01B 3/56 33/417 |
| 5,687,628 | A | | 11/1997 | Liao |
| 6,141,882 | A | | 11/2000 | Syken |
| 6,237,238 | B1 | * | 5/2001 | Shapiro ..................... B43L 7/10 33/471 |
| 6,553,676 | B1 | | 4/2003 | Carlson et al. |
| 6,978,550 | B2 | | 12/2005 | Xieh |
| 8,191,272 | B1 | * | 6/2012 | Light ..................... B43L 13/002 33/424 |
| 2006/0005408 | A1 | * | 1/2006 | Fernand ................... B26B 29/06 33/471 |
| 2006/0179996 | A1 | * | 8/2006 | Shapiro .................. G01B 3/563 83/821 |
| 2008/0034599 | A1 | * | 2/2008 | Hamilton ................. B25H 7/00 33/471 |
| 2010/0043243 | A1 | * | 2/2010 | Li ............................. B43L 7/10 33/471 |
| 2011/0061252 | A1 | * | 3/2011 | Cerwin ..................... B25H 7/02 33/414 |
| 2015/0101206 | A1 | * | 4/2015 | Smith ..................... G01B 3/563 33/534 |
| 2015/0168122 | A1 | * | 6/2015 | Cruickshanks ........ G01B 3/563 33/425 |

* cited by examiner

*Primary Examiner* — G. Bradley Bennett

(57) ABSTRACT

A protractor, the protractor comprising: a protractor first element and a protractor second element mountable to each other so as to be rotatable relative to each other about a rotation axis; the protractor first and second elements being mountable to each other in an unlocked configuration and in a locked configuration, wherein, in the unlocked configuration, the protractor first and second elements are removable from each other, and, in the locked configuration, the protractor first and second elements remain mounted to each other unless the unlocked configuration is achieved; wherein, in the locked configuration, the protractor first and second elements are biased towards each other to create a predetermined frictional force therebetween resisting a rotation of the protractor first and second elements relative to each other about the rotation axis.

19 Claims, 4 Drawing Sheets

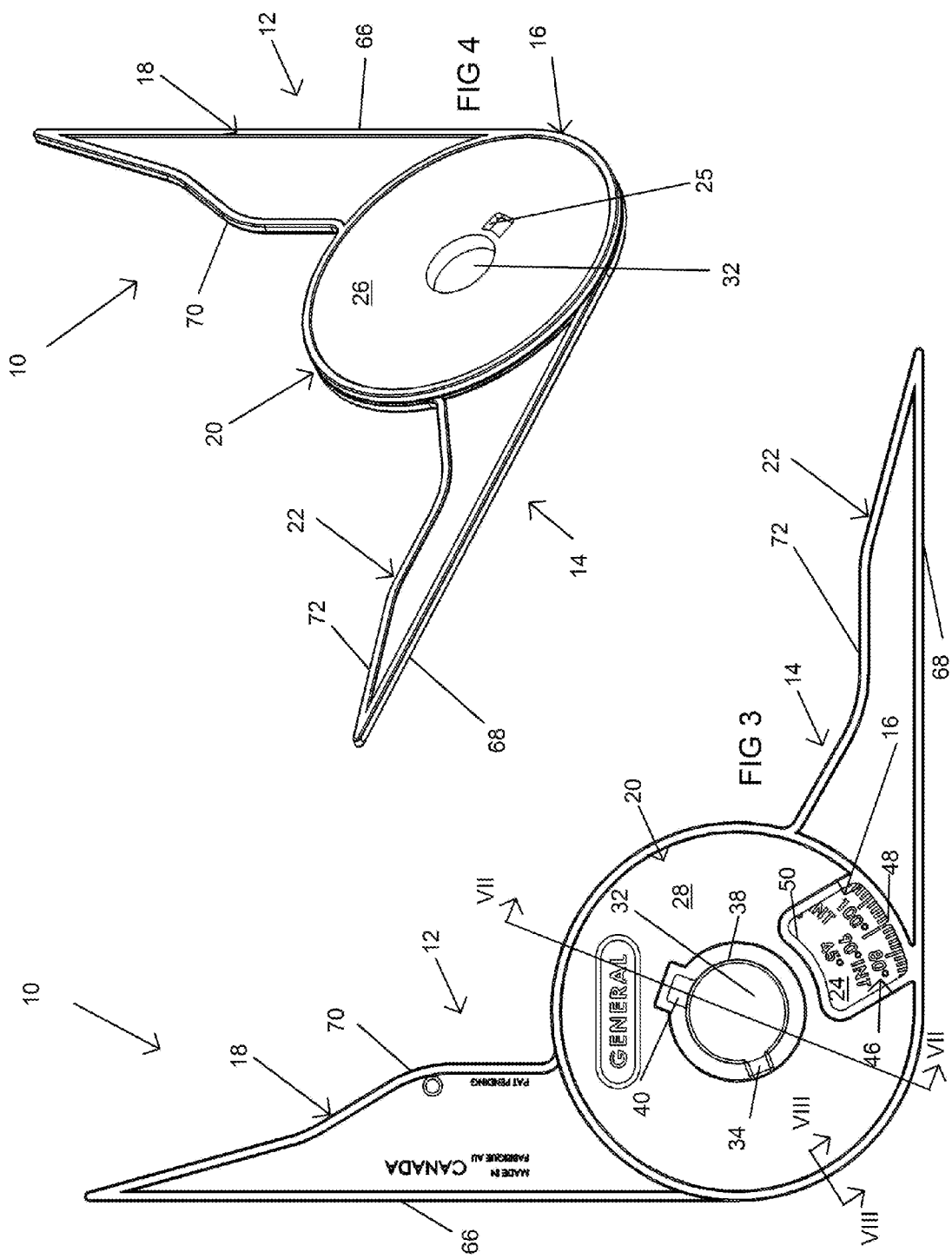

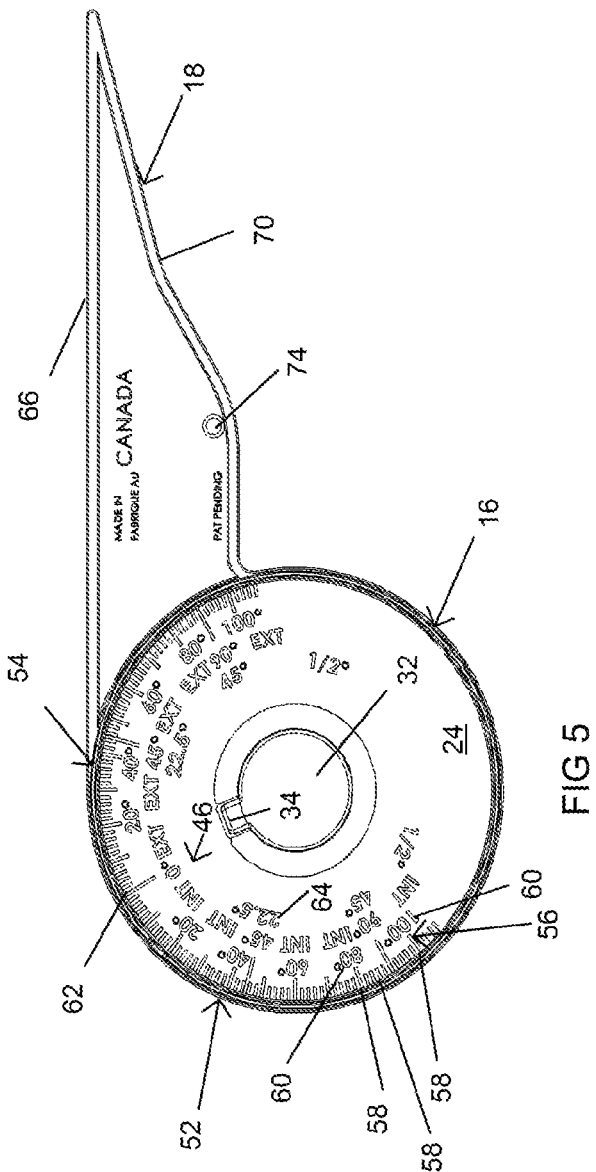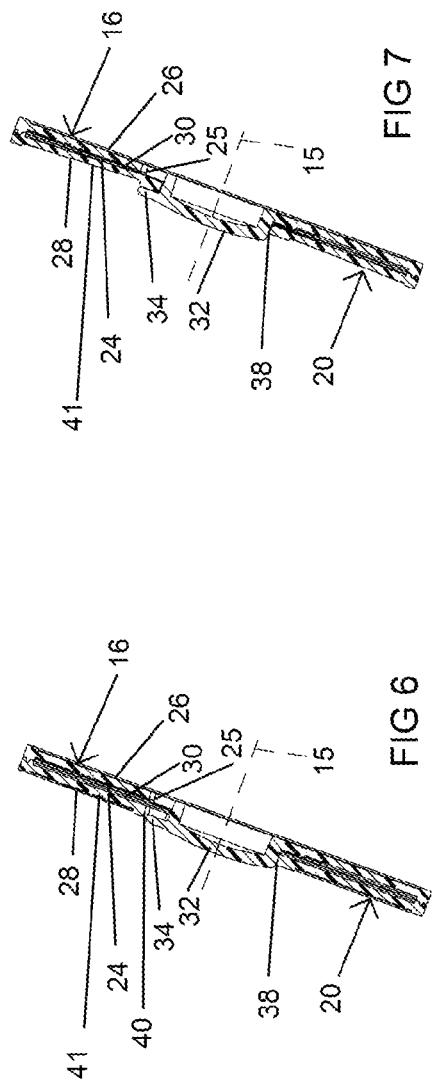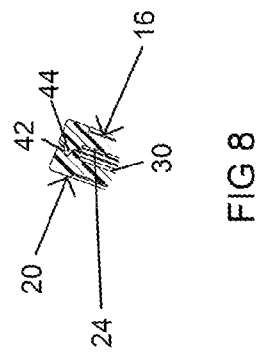

PROTRACTOR

FIELD OF THE INVENTION

The present invention relates to measurements. More specifically, the present invention is concerned with a protractor.

BACKGROUND OF THE INVENTION

In many applications, there is a need to measure angles on an object. For example, in many construction tasks, such as in installing crown moldings or other moldings, there is a need to measure angles before cutting the item to install.

Typically, there are two types of angles to measure : external angles and internal angles. In many cases, a measurement device for measuring the angle is manipulated differently to measure external and internal angles. In some cases, this creates confusion in the manipulation of the measurement device for some users.

Furthermore, there is often a need to divide the measured angle by a predetermined factor, for example two. This is the case for example when installing ogees wherein an angle of cut on the ogee typically equals to half of a measured angle between two intersecting walls. Accordingly, the user needs to do repetitive calculations, which increases risks of errors.

Yet furthermore, existing protractors include two elements that are rotatable relative to each other. In a construction environment, debris can become lodged between the elements and make smooth operation of the protractor difficult. Also, the two elements may be loosely coupled to each other, which creates a risk that the two elements will move between the time at which they are abutted against the objects for which an angle measure is required and the time at which this measure is read from the protractor.

Against this background, there exists a need in the industry to provide a novel protractor.

OBJECTS OF THE INVENTION

An object of the present invention is therefore to provide an improved protractor.

SUMMARY OF THE INVENTION

In a broad aspect, the invention provides a protractor, the protractor comprising: a protractor first element and a protractor second element mountable to each other so as to be rotatable relative to each other about a rotation axis; the protractor first and second elements being mountable to each other in an unlocked configuration and in a locked configuration, wherein, in the unlocked configuration, the protractor first and second elements are removable from each other, and, in the locked configuration, the protractor first and second elements remain mounted to each other unless the unlocked configuration is achieved; wherein, in the locked configuration, the protractor first and second elements are biased towards each other to create a predetermined frictional force therebetween resisting a rotation of the protractor first and second elements relative to each other about the rotation axis.

The invention may also provide a protractor wherein the unlocked configuration is achieved when the protractor first and second elements are in a predetermined angular position relative to each other, and the locked configuration is achieved by rotating the protractor first and second elements relative to each other away from the predetermined angular position.

The invention may also provide a protractor wherein the protractor second element includes a resiliently deformable portion, the resiliently deformable portion being deformable between an undeformed configuration and a deformed configuration, the resiliently deformable portion being in the undeformed configuration in the unlocked configuration and the resiliently deformable portion being in the deformed configuration in the locked configuration.

The invention may also provide a protractor wherein the protractor first element defines a first element body and a first element arm extending therefrom; the protractor second element defines a second element body and a second element arm extending therefrom, the second element body being removably mountable to the first element body; and the second element body is resiliently deformable between an undeformed configuration and a deformed configuration, the second element body being in the undeformed configuration in the unlocked configuration and the second element body being in the deformed configuration in the locked configuration.

The invention may also provide a protractor wherein the first element body defines substantially opposed first element body first and second surfaces, a mounting protrusion extending from the first element body first surface and a key extending substantially radially outwardly from the mounting protrusion spaced apart from the first element body first surface so as to define a gap between the key and the first element body first surface; the second element body defines substantially opposed second element body first and second surfaces, a mounting aperture extending therethrough therebetween, the mounting protrusion being inserted in the mounting aperture when the protractor first and second elements are operatively mounted to each other, and a keyway extending substantially radially outwardly from the mounting aperture and between the second element body first and second surfaces, the keyway being configured and sized for receiving the key thereinto; the protractor first and second elements are in the unlocked configuration when the key and the keyway are aligned with each other and the key is received in the keyway; the protractor first and second elements are in the locked configuration when the first and second element bodies are mounted to each other and angularly positioned relative to each other so that the key and keyway are offset from each other.

The invention may also provide a protractor wherein the protractor first and second elements are rotatable relative to each other about the rotation axis away from the unlocked configuration only when the second element body is moved to the deformed configuration.

The invention may also provide a protractor wherein the gap is dimensioned so that when the first and second element bodies are operatively mounted to each other, the second element body remains in the deformed configuration unless the key and keyway are aligned with each other.

The invention may also provide a protractor wherein the mounting protrusion is substantially cylindrical and the mounting aperture is substantially disc-shaped.

The invention may also provide a protractor wherein the key and keyway have substantially similar shapes.

The invention may also provide a protractor wherein the key and keyway are substantially rectangular.

The invention may also provide a protractor wherein a first one of the first element body first surface and the second element body second surface is provided with a substantially annular groove extending thereinto and a second one of the first element body first surface and the second element body second surface is provided with a substantially annular protrusion extending therefrom, the substantially annular groove and protrusion having substantially similar diameters and being both centered relative to the rotation axis with the substantially annular protrusion being at least in part received in the substantially annular groove when the protractor first and second elements are operatively mounted to each other.

The invention may also provide a protractor wherein the substantially annular groove and protrusion are complementarily shaped.

The invention may also provide a protractor wherein the substantially annular groove and protrusion have a substantially V-shaped transversal cross-sectional configuration.

The invention may also provide a protractor wherein the V-shaped configuration tapers at an angle of about 45 degrees.

The invention may also provide a protractor wherein a first one of the first and second element bodies is provided with angle markings indicative of an arm relative angle between the first and second element arms and a second one of the first and second element bodies is provided with a reference marker for indicating which of the angle markings corresponds to the arm relative angle between the first and second element arms.

The invention may also provide a protractor wherein the angle markings are provided on the first element body first surface and the second element body is provided with a reading window movable across the angle markings when the protractor first and second elements are rotated about the rotation axis relative to each other, the reference marker being provided substantially adjacent the reading window; or the angle markings are provided on the second element body second surface and the first element body is provided with a reading window movable across the angle markings when the protractor first and second elements are rotated about the rotation axis relative to each other, the reference marker being provided substantially adjacent the reading window. The terminology "or" herein is not an "exclusive or" as angle markings could be present on both the first element body first surface and second element body second surface with windows being provided in both the first and second element bodies.

The invention may also provide a protractor wherein the first and second element arms are each provided with a respective susbtantially rectilinear edge, the angle markings being indicative of an edge relative angle between the substantially rectilinear edges.

The invention may also provide a protractor wherein a first one of the first and second element arms is provided with a pin extending therefrom, a second one of the first and second element arms being in register with the pin in the unlocked configuration, the pin being configured and sized to prevent rotation from the locked configuration to the unlocked configuration by interfering with the second one of the first and second element arms unless the second one of the first and second element arms is resiliently deformed away from the pin.

Advantageously, removing the protractor first and second elements from each other allows cleaning the protractor, which ensures that the predetermined force, which is selected to provide efficient and convenient operation of the protractor, can be achieved consistently, even in dirty environments. In turn, this predetermined force is selected so that smooth rotation of the protractor first and second elements can be achieved while being large enough to keep them fixed relative to each other to allow reading of any measurement taken.

The proposed protractor is also relatively easy to use and in some embodiments helps in eliminating a confusion between measurement of internal and external angles. Furthermore, the protractor is relatively inexpensive to manufacture. Also, the protractor reduces risks of errors when measuring angles and cutting moldings or other objects.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 3, in a top elevation view, illustrates the protractor shown in FIGS. 1 and 2, the protractor being shown assembled and in a locked configuration;

FIG. 4, in an alternative perspective view, illustrates the protractor shown in FIGS. 1 to 3;

FIG. 5, in a top elevation view, illustrates a protractor first element part of the protractor shown in FIGS. 1 to 4;

FIG. 6, in a partial side cross-sectional view along section line VI-VI of FIG. 2, illustrates the protractor shown in FIGS. 1 to 4 with the protractor in the unlocked configuration;

FIG. 7, in a partial side cross-sectional view along section line VII-VII of FIG. 3, illustrates the protractor shown in FIGS. 1 to 4 with the protractor in the locked configuration; and FIG. 8, in a partial cross-sectional view along section line VIII-VIII of FIG. 3, illustrates the protractor shown in FIGS. 1 to 4 with the protractor in the locked configuration.

DETAILED DESCRIPTION

Figure 1:
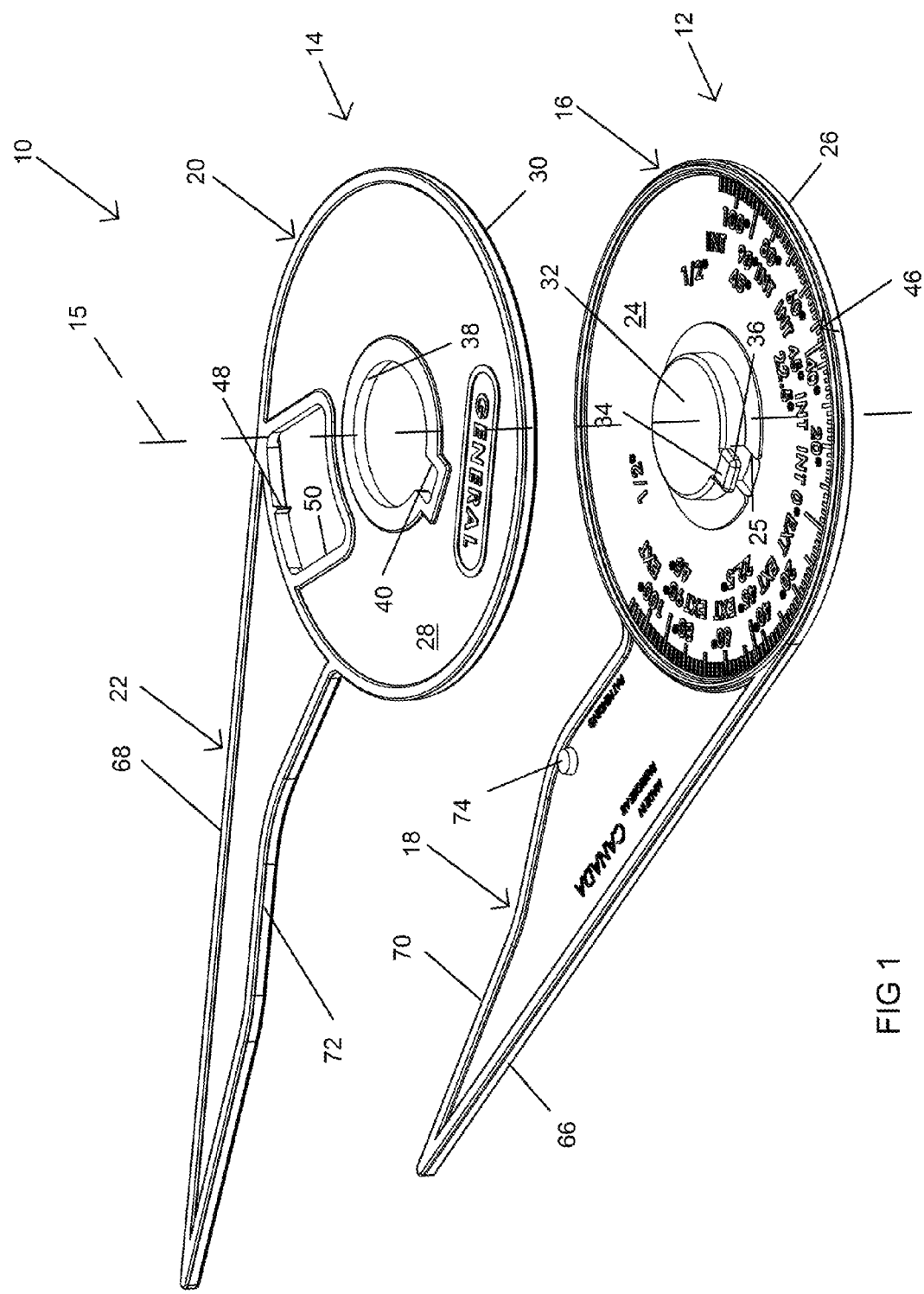
FIG. 1, in a perspective exploded view, illustrates a protractor in accordance with an embodiment of the present invention.
Figure 2:
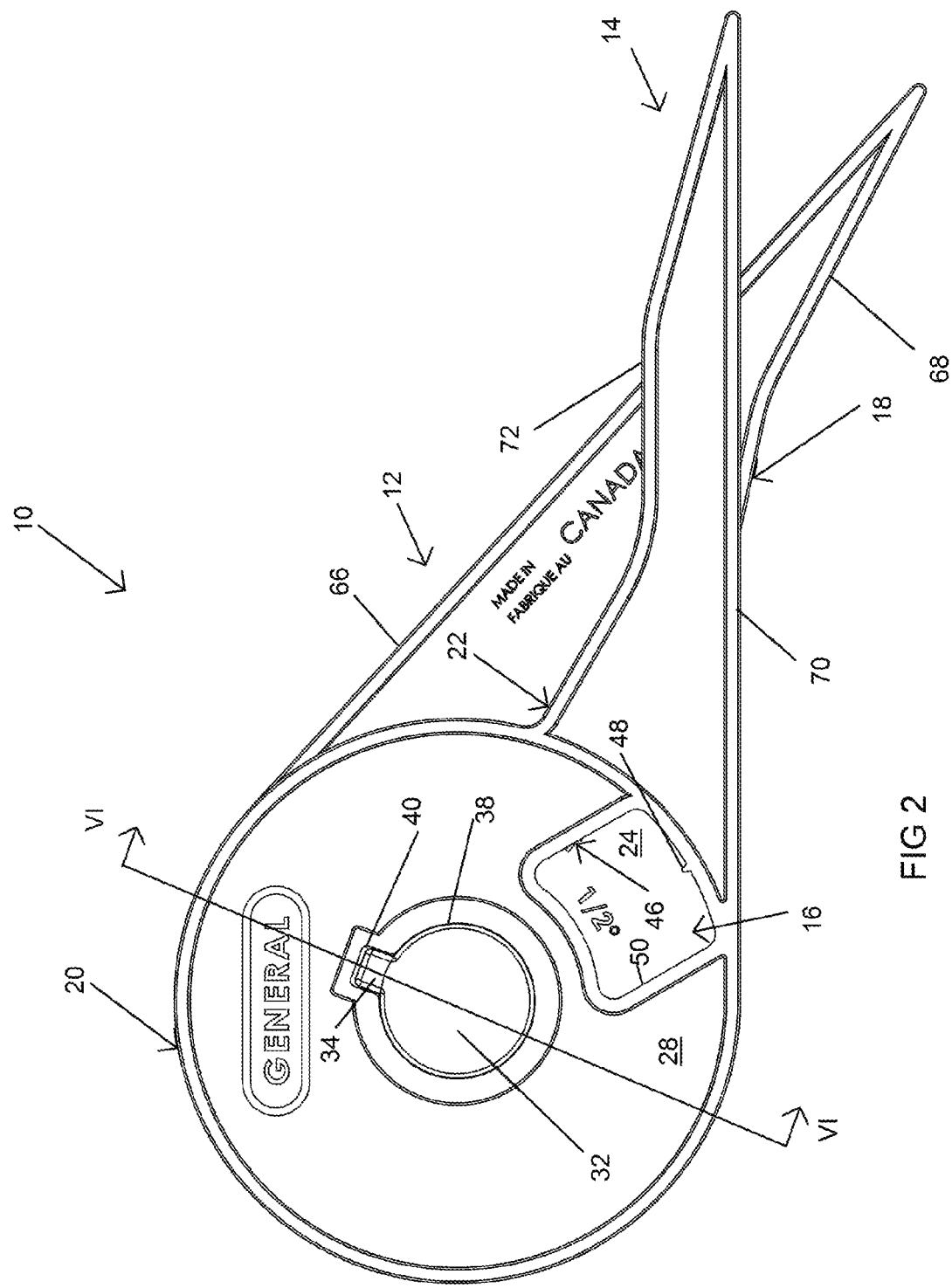
FIG. 2, in a top elevation view, illustrates the protractor shown in FIG. 1, the protractor being shown assembled and in an unlocked configuration.

FIGS. 1 to 8 illustrate various features of a protractor 10 in accordance with an embodiment of the present invention. Referring for example to FIG. 1, the protractor 10 includes a protractor first element 12 and a protractor second element 14 mountable to each other so as to be rotatable relative to each other about a rotation axis 15. The protractor first and second elements 12 and 14 are mountable to each other in an unlocked configuration (seen in FIG. 2) and in a locked configuration (seen in FIG. 3). In the unlocked configuration, the protractor first and second elements 12 and 14 are removable from each other, and, in the locked configuration, the protractor first and second elements 12 and 14 remain mounted to each other unless the unlocked configuration is achieved. In the locked configuration, the protractor first and second elements 12 and 14 are biased towards each other to create a predetermined frictional force therebetween resisting a rotation of the protractor first and second elements 12 and 14 relative to each other about the rotation axis 15.

The term "substantially" is used throughout this document to indicate variations in the thus qualifies terms. These variations are variations that do not materially affect the manner in which the invention works and can be due, for example, to uncertainty in manufacturing processes or to small deviations from a nominal value that do not cause significant changes to the invention. These variations are to be interpreted from the point of view of the person skilled in the art.

The predetermined frictional force is typically such that smooth rotation of the protractor first and second elements 12 and 14 relative to each other about the rotation axis 15 is achieved while the relative angular relationship between the protractor first and second elements 12 and 14 can relatively easily be maintained between the time a measurement is taken on an object and the time this measurement is used or read. In other words, the relative angular relationship between the protractor first and second elements 12 and 14 is not easily inadvertently affected by a careful enough user.

In a typical embodiment, the unlocked configuration is achieved when the protractor first and second elements 12 and 14 are in a predetermined angular position relative to each other, and the locked configuration is achieved by rotating the protractor first and second elements 12 and 14 relative to each other away from the predetermined angular position about the rotation axis 15. In alternative embodiments, the protractor first and second elements 12 and 14 could be locked to each other in any other suitable manner, for example using a nut and bolt combination, among other possibilities.

Typically, the protractor second element 14 includes a resiliently deformable portion 41, the resiliently deformable portion 41 being deformable between an undeformed configuration (seen in FIG. 6) and a deformed configuration (seen in FIG. 7). For example, the resiliently deformable portion is part of the protractor second element 14, as further described hereinbelow. The resiliently deformable portion 41 is in the undeformed configuration in the unlocked configuration and the resiliently deformable portion 41 is in the deformed configuration in the locked configuration. Deformation of the resiliently deformable portion 41 compresses the protractor first and second elements 12 and 14 against each other, which creates the predetermined frictional force therebetween. In alternative embodiments, a deformable element, such as a deformable washer for example, is inserted between the protractor first and second elements 12 and 14 to compress them against each other to achieve the same result.

More specifically, referring to FIG. 1, the protractor first element 12 defines a first element body 16 and a first element arm 18 extending therefrom. Similarly, the protractor second element 14 defines a second element body 20 and a second element arm 22 extending therefrom, the second element body 20 being removably mountable to the first element body 16. The first and second element bodies 16 and 20 shown in the drawings are substantially disc-shaped, but other shapes are within the scope of the invention.

The second element body 20 is resiliently deformable between an undeformed configuration (seen in FIG. 6) and a deformed configuration (seen in FIG. 7). The second element body 20 is in the undeformed configuration in the unlocked configuration and the second element body 20 is in the deformed configuration in the locked configuration. To that effect, the second element body 20 includes a resiliently deformable portion 41, forming typically 1 portion of the second element body 20 surrounding the mounting aperture 38 (described hereinbelow).

Returning to FIG. 1, the first element body 16 defines substantially opposed first element body first and second surfaces 24 and 26, a mounting protrusion 32 extending from the first element body first surface 24 and a key 34 extending substantially radially outwardly from the mounting protrusion 32 spaced apart from the first element body first surface 24 so as to define a gap 36 between the key and the first element body first surface 24. The mounting protrusion 32 is substantially cylindrical, but other configurations are within the scope of the present invention, for example mounting protrusions 32 with a polygonal transversal cross-sectional configuration. It should be noted that for ease of manufacturing, an aperture 25 having a shape similar to the shape of the key 34 may extend between the first element body first and second surfaces 24 and 26 in register with the key 34. The gap 36 is then defined as a space between the key 34 and portions of the first element body first surface 24 adjacent the aperture 25.

The second element body 20 defines substantially opposed second element body first and second surfaces 28 and 30, a substantially disc-shaped mounting aperture 38 extending therethrough therebetween, the mounting protrusion 32 being inserted in the mounting aperture 38 when the protractor first and second elements 12 and 14 are operatively mounted to each other, and a keyway 40 extending substantially radially outwardly from the mounting aperture 38 and between the second element body first and second surfaces 28 and 30, the keyway 40 being configured and sized for receiving the key 34 thereinto. In some embodiments, but not necessarily, the second element body 20 is slightly thicker adjacent the mounting aperture 38. This allows using less material for the remainder of the second element body 20 while ensuring good material properties for securing the protractor first and second elements 12 and 14 to each other.

To allow its deformation, the resiliently deformable portion 41 is spaced apart from the first element body first surface 24 in the undeformed configuration. In the embodiment of the invention shown in the drawings, this is achieved by having the peripheral portion of the first element body first surface 24 and the peripheral portion of the second element body second surface 30 raised slightly relative to the remainder thereof. Therefore, in the undeformed configuration, the first element body first surface 24 and the second element body second surface 30 contact each other only at their periphery, which leaves room for the deformation of the deformable portion 41. However, in alternative embodiments, other manners of achieving this result are possible. For example, in some embodiments, only one of the first element body first surface 24 and the second element body second surface 30 is raised relative to the remainder thereof. In another example, the resiliently deformable portion 41 is defined by having the second element body 20 dome-shaped.

The protractor first and second elements 12 and 14 are in the unlocked configuration when the key 34 and the keyway 40 are aligned with each other and the key 34 is received in the keyway 40. The protractor first and second elements 12 and 14 are in the locked configuration when the first and second element bodies 16 and 20 are mounted to each other and angularly positioned relative to each other so that the key 34 and keyway 40 are offset from each other. Typically, the key 34 and keyway 40 have substantially similar shapes. For example, the key 34 and keyway 40 are substantially rectangular, but other shapes, such as trapezoidal among others, are within the scope of the invention.

Typically the protractor first and second elements 12 and 14 are rotatable relative to each other about the rotation axis 15 away from the unlocked configuration only when the second element body 20 is moved to the deformed configuration. Also, the gap 36 is dimensioned so that when the first and second element bodies 16 and 20 are operatively mounted to each other, the second element body 20 remains in the deformed configuration unless the key 34 and keyway 40 are aligned with each other. In other words, in the unlocked configuration the key 34 is received in the keyway 40 and rotation about the rotation axis 15 is prevented. When the central portion of the second element body 20 is depressed towards the first element body 16, the keyway 40 is moved to a different plane. While the key 34 and the keyway 40 are still in register with each other, they are in different planes once the second element body 20 is in the deformed configuration. Typically, the gap 36 has a width substantially similar to a thickness of the second element body adjacent the mounting aperture 38.

In some embodiments of the invention, in addition to centering the first and second element bodies 16 and 20 with the mounting protrusion 32 and the mounting aperture 38, another structure is provided to provide this centering. To that effect, as better seen in FIG. 8, the first element body first surface 24 is provided with a substantially annular protrusion 44 extending therefrom and the second element body second surface 30 is provided with a substantially annular groove 42 extending thereinto. The substantially annular groove and protrusion 42 and 44 have substantially similar diameters and are both centered relative to the rotation axis 15 with the substantially annular protrusion 44 being at least in part received in the substantially annular groove 42 when the protractor first and second elements 12 and 14 are operatively mounted to each other. The substantially annular groove and protrusion 42 and 44 greatly increase the precision of the protractor 10 as they allow precise centering with no or minimal play therebetween of the first and second element bodies 16 and 20 relative to each other.

Typically, the substantially annular groove and protrusion 42 and 44 are complementarily shaped. For example, in a specific embodiment of the invention, the substantially annular groove and protrusion 42 and 44 have a substantially V-shaped transversal cross-sectional configuration, with either a rounded apex, as shown in the drawings, or a pointed apex. However, other configurations, such as square, rectangular and curved, among others, are within the scope of the invention. Advantageously, it was found that a V-shaped configuration tapering at an angle of from about 30 degrees to about 60 degrees, and more specifically in some embodiments at about 45 degrees, provides good frictional characteristics for the intended purpose of the protractor 10.

Typically, a first one of the first and second element bodies 16 and 20, the first element body 16 in the protractor 10 illustrated in the drawings, is provided with angle markings 46 indicative of an arm relative angle between the first and second element arms 18 and 22, as better seen in FIGS. 1 and 5. A second one of the first and second element bodies 16 and 20, the second element body 20 in the protractor 10 illustrated in the drawings, is provided with a reference marker 48 for indicating which of the angle markings 46 corresponds to the arm relative angle between the first and second element arms 18 and 22, as seen in FIGS. 1, 2, 3 and 5. It should be noted that in alternative embodiments, the protractor 10 is not provided with any marking and may then serve to simply reproduce an angle, without measuring its value. For the reminder of the document, the embodiment in which the angle markings 46 are on the first element body 16 and the reference marker 48 is on the second element body 20 is described, with the understanding that the reverse possibility is within the scope of the invention.

In a specific embodiment, the angle markings 46 are provided on the first element body first surface 24, in a generally arc segment shaped configuration, and the second element body 20 is provided with a reading window 50 movable across the angle markings 46 when the protractor first and second elements 12 and 14 are rotated about the rotation axis 15 relative to each other. The reference marker 48 is provided substantially adjacent the reading window 50. For example, the reference marker 48 takes the form of a substantially triangular protrusion extending into the reading window 50 from the periphery thereof. However, in alternative embodiments, the reference marker 48 may take any other suitable forms, such as a short line printed adjacent the reading window 50, among other possibilities. In yet other embodiments, the whole second element body 20 is transparent and no reading window 50 is required. In some embodiments, not shown in the drawings, the reading window 50 is provided with a magnifier facilitating reading of the angle markings 46.

Referring to FIG. 5, the angle markings 46 includes a first subscale 52 for measuring internal angles and a second subscale 54 for measuring external angles. For the purpose of this specification, external angles are angles similar to angles external to an object and internal angles are angles similar to angles internal to an object. An example of an internal angle is an angle between two walls within a cubic room in a house. An example of an external angle is an angle between two walls outside of a parallelepiped-shaped house. In a specific example of implementation, the first subscale 52 includes letters forming a portion or a totality of the word "internal", for example the letters "INT", and the second subscale 54 includes letters forming a portion or a totality of the word "external", for example the letters "EXT". However, any other suitable coding is within the scope of the invention, including, but not limited to, a color coding using different colors for each of the first and second subscales 52 and 54.

Each of the first and second subscales 52 and 54 includes a plurality of measurement indications 56. The measurement indications 56 include measurement graduations 58 and, for at least some of them, measurement values 60. For example, the measurement graduations 58 take the form of printed, embossed, engraved or otherwise applied line segments substantially evenly spaced peripherally on the first element body first surface 24, but this is not necessarily the case in all embodiments of the invention. Also, the measurement values 60 include numbers that are also printed, embossed, engraved or otherwise applied onto the first element body first surface 24. The angle to measure is indicated conventionally by a measurement values 60 on either of the first and second subscales 52 and 54 adjacent one of the measurement graduations 58 facing the reference marker 48, or through interpolation between adjacent measurement values 60 when the measurement graduation 58 closest to the reference marker 48 is not associated with a measurement value 60.

In some embodiments of the invention, the first and second subscales 52 and 54 are adjacent to each other and share a common indication 62. As shown in the drawings, although not necessarily, the common indication 62 corresponds to a measurement of zero degree. In these embodiments, the first and second subscales 52 and 54 increase in measured angle value in opposite directions from the common indication 62.

In some embodiments of the invention, multiplied measurement values 64 indicating a predetermined multiple of the measured angle, for example 0.5 times the measured angles, are provided adjacent the measurement values. The multiplied measurement values 64 are useful, among other uses, in cutting two moldings such that the two moldings are well adjusted to the two items and such that the portions to cut from the moldings to make them fit are substantially equally angled.

Returning to FIG. 1, in a typical embodiment, the first and second element arms 18 and 22 are each provided with a respective substantially rectilinear edge 66 and 68. The angle markings 46 are indicative of an edge relative angle between the substantially rectilinear edges 66 and 68. Typically, the first and second element arms 18 and 22 are also provided with a respective non-rectilinear edge 70 and 72 opposed to the rectilinear edges 66 and 68 that differ in shape enough from the substantially rectilinear edges 66 and 68 so that no confusion is created for the intended user of the protractor 10 as to which edges from the edges 66, 68, 70 and 72 are to be used to take measurements.

In the specific embodiment of the invention shown in the drawings, the substantially rectilinear edge 66 and non-rectilinear edge 70 both extend away from the first element body 16 from circumferencially spaced apart locations and merge together opposed to the first element body 16. Similarly, the substantially rectilinear edge 68 and non-rectilinear edge 72 both extend away from the second element body 20 from circumferencially spaced apart locations and merge together opposed to the second element body 20. However, this is not necessarily the case in other embodiments. Also, although not necessary in all embodiments, the non-rectilinear edges 70 and 72 may have complementary shapes so that in a transportation configuration, they together have the appearance of a triangle.

In some embodiments of the invention, a first one of the first and second element arms 18 and 22 is provided with a pin 74 extending therefrom and a second one of the first and second element arms 18 and 22 is in register with the pin 74 in the unlocked configuration. In the embodiment of the invention shown in the drawings, the pin 74 is provided on the first element arm 18. The pin 74 is configured and sized to prevent rotation from the locked configuration to the unlocked configuration by interfering with the second one of the first and second element arms 18 and 22 unless the second one of the first and second element arms 18 and 22 is resiliently deformed away from the pin 74. For example, both the protractor first and second elements 12 and 14 are substantially flat and parallel to each other when mounted to each other in the locked configuration and the pin 74 extends from the protractor first element 12 along a distance similar to the thickness of the protractor second element 14.

The first and second element bodies 16 and 20 have different feature couples that work together to achieve a functionality. Such couples include: the mounting protrusion 32 and key 34 with the mounting aperture 38 and keyway 40, the substantially annular groove 42 with the substantially annular protrusion 44, the pin 74 with the second element arm 20, and the angle markings 46 with the reference marker 48. A specific embodiment in which one feature of each couple is on the protractor first element 12 and the other on the protractor second element 14 has been described hereinabove. However, in other embodiments, one or more of the couples of features has its elements reversed so that protractor first and second elements 12 and 14 include different ones of the features. For example, and non-limitingly, the substantially annular groove 42 may be provided in the first element body 16, while the substantially annular protrusion 44 may be provided on the second element body 20, all the other elements remaining as described hereinabove.

Typically, the protractor first and second elements 12 and 14 are each integrally formed as a single piece of material, for example by being molded in a polymer.

In use, the protractor first and second elements 12 and 14 may first be provided detached from each other. This facilitates cleaning to ensure proper operation of the protractor 10. Then, the mounting protrusion 32 is inserted in the mounting aperture 38 with the key 34 aligned with the keyway 40. This will result in the second element arm 22 being in register with the pin 74 and abutting thereagainst.

Subsequently, the intended user typically depresses the second element body 20 adjacent the mounting aperture 38 and slightly rotates the protractor first and second elements 12 and 14 relative to each other. This action achieves many purposes. First, the protractor first and second elements 12 and 14 are then in the locked configuration and remain attached to each other without further user involvement. Also, the pin 74 is now withdrawn from the second element arm 22, which is then parallel to the first element arm 18. Finally, the second element body 20 remains compressed against the first element body 16, which ensures optimal penetration of the substantially annular protrusion 44 in the substantially annular groove 42 and optimal friction therebetween. It should be noted that this friction depends on the material properties of the protractor first and second elements 12 and 14, and are not adjusted by the user of the protractor 10. This ensures repeatable and optimal operation of the protractor 10.

Once all the previous assembly steps are completed, the protractor first and second elements 12 and 14 are rotated relative to each other until the rectilinear edges 66 and 68 abut each against a side of an angle to measure. Subsequently, the protractor 10 is removed from the angle to measure and oriented so that reading the numerical value of this angle, through the angle markings 46 and reference marker 48, is easily preformed.

If desired, disassembly of the protractor 10 can be achieved by rotating the protractor first and second elements 12 and 14 until the second element arm 22 abuts against the pin 74. Then the second element arm 22 is deformed away from the first element arm 18 to allow insertion of the pin 74 therebetween. This rotation is performed until the key 34 and keyway 40 are aligned with each other, at which point the compression of the second element body 20 will be released, which will result in the second element body 20 popping out and separating from the first element body 16 without further user intervention.

Although the present invention has been described hereinabove by way of preferred embodiments thereof, it can be modified, without departing from the spirit and nature of the subject invention as defined in the appended claims.

What is claimed is:

1. A protractor, said protractor comprising:
a protractor first element and a protractor second element mountable to each other so as to be rotatable relative to each other about a rotation axis;
said protractor first and second elements being mountable to each other in an unlocked configuration and in a locked configuration, wherein, in said unlocked configuration, said protractor first and second elements are removable from each other, and, in said locked configuration, said protractor first and second elements remain mounted to each other unless said unlocked configuration is achieved;
wherein, in said locked configuration, said protractor first and second elements are biased towards each other to create a predetermined frictional force therebetween resisting a rotation of said protractor first and second elements relative to each other about said rotation axis.

2. The protractor as defined in claim 1, wherein said unlocked configuration is achieved when said protractor first and second elements are in a predetermined angular position relative to each other, and said locked configuration is achieved by rotating said protractor first and second elements relative to each other away from said predetermined angular position.

3. The protractor as defined in claim 2, wherein said protractor second element includes a resiliently deformable portion, said resiliently deformable portion being deformable between an undeformed configuration and a deformed configuration, said resiliently deformable portion being in said undeformed configuration in said unlocked configuration and said resiliently deformable portion being in said deformed configuration in said locked configuration.

4. The protractor as defined in claim 1, wherein
said protractor first element defines a first element body and a first element arm extending therefrom;
said protractor second element defines a second element body and a second element arm extending therefrom, said second element body being removably mountable to said first element body; and
said second element body is resiliently deformable between an undeformed configuration and a deformed configuration, said second element body being in said undeformed configuration in said unlocked configuration and said second element body being in said deformed configuration in said locked configuration.

5. The protractor as defined in claim 4, wherein
said first element body defines substantially opposed first element body first and second surfaces, a mounting protrusion extending from said first element body first surface and a key extending substantially radially outwardly from said mounting protrusion spaced apart from said first element body first surface so as to define a gap between said key and said first element body first surface;
said second element body defines substantially opposed second element body first and second surfaces, a mounting aperture extending therebetween through said second element body, said mounting protrusion being inserted in said mounting aperture when said protractor first and second elements are operatively mounted to each other, and a keyway extending substantially radially outwardly from said mounting aperture and between said second element body first and second surfaces, said keyway being configured and sized for receiving said key thereinto;
said protractor first and second elements are in said unlocked configuration when said key and said keyway are aligned with each other and said key is received in said keyway;
said protractor first and second elements are in said locked configuration when said first and second element bodies are mounted to each other and angularly positioned relative to each other so that said key and keyway are offset from each other.

6. The protractor as defined in claim 5, wherein said protractor first and second elements are rotatable relative to each other about said rotation axis away from said unlocked configuration only when said second element body is moved to said deformed configuration.

7. The protractor as defined in claim 6, wherein said gap is dimensioned so that when said first and second element bodies are operatively mounted to each other, said second element body remains in said deformed configuration unless said key and keyway are aligned with each other.

8. The protractor as defined in claim 5, wherein said mounting protrusion is substantially cylindrical and said mounting aperture is substantially disc-shaped.

9. The protractor as defined in claim 5, wherein said key and keyway have substantially similar shapes.

10. The protractor as defined in claim 9, wherein said key and keyway are substantially rectangular.

11. The protractor as defined in claim 5, wherein a first one of said first element body first surface and said second element body second surface is provided with a substantially annular groove extending thereinto and a second one of said first element body first surface and said second element body second surface is provided with a substantially annular protrusion extending therefrom, said substantially annular groove and protrusion having substantially similar diameters and being both centered relative to said rotation axis with said substantially annular protrusion being at least in part received in said substantially annular groove when said protractor first and second elements are operatively mounted to each other.

12. The protractor as defined in claim 11, wherein said substantially annular groove and protrusion are complementarily shaped.

13. The protractor as defined in claim 12, wherein said substantially annular groove and protrusion have a substantially V-shaped transversal cross-sectional configuration.

14. The protractor as defined in claim 13, wherein said V-shaped configuration tapers at an angle of between about 30 degrees and about 60 degrees.

15. The protractor as defined in claim 4, wherein a first one of said first and second element bodies is provided with angle markings indicative of an arm relative angle between said first and second element arms and a second one of said first and second element bodies is provided with a reference marker for indicating which of said angle markings corresponds to said arm relative angle between said first and second element arms.

16. The protractor as defined in claim 15, wherein
said angle markings are provided on said first element body first surface and said second element body is provided with a reading window movable across said angle markings when said protractor first and second elements are rotated about said rotation axis relative to each other, said reference marker being provided substantially adjacent said reading window; or
said angle markings are provided on said second element body second surface and said first element body is provided with a reading window movable across said angle markings when said protractor first and second elements are rotated about said rotation axis relative to each other, said reference marker being provided substantially adjacent said reading window.

17. The protractor as defined in claim 15, wherein said angle markings include a first subscale for measuring internal angles and a second subscale for measuring external angles.

18. The protractor as defined in claim 15, wherein said first and second element arms are each provided with a respective susbtantially rectilinear edge, said angle markings being indicative of an edge relative angle between said substantially rectilinear edges.

19. The protractor as defined in claim 4, wherein a first one of said first and second element arms is provided with a pin extending therefrom, a second one of said first and second element arms being in register with said pin in said unlocked configuration, said pin being configured and sized to prevent rotation from said locked configuration to said unlocked configuration by interfering with said second one of said first and second element arms unless said second one of said first and second element arms is resiliently deformed away from said pin.

* * * * *